United States Patent [19]

Kuo

[11] Patent Number: 5,256,756

[45] Date of Patent: * Oct. 26, 1993

[54] THERMOSETTING COATING COMPOSITIONS

[75] Inventor: Thauming Kuo, Kingsport, Tenn.

[73] Assignee: Eastman Kodak Company, Rochester, N.Y.

[*] Notice: The portion of the term of this patent subsequent to Sep. 14, 2010 has been disclaimed.

[21] Appl. No.: 954,992

[22] Filed: Oct. 1, 1992

Related U.S. Application Data

[63] Continuation-in-part of Ser. No. 883,079, May 15, 1992, which is a continuation-in-part of Ser. No. 712,380, Jun. 10, 1991, abandoned.

[51] Int. Cl.$^5$ ............................................. C08G 63/00
[52] U.S. Cl. .................................. 528/176; 528/100; 528/190; 528/192; 528/194; 524/601
[58] Field of Search ............... 528/100, 176, 190, 192, 528/194; 524/601

[56] References Cited

U.S. PATENT DOCUMENTS

| | | | |
|---|---|---|---|
| 2,993,873 | 7/1961 | Heinrich et al. | 260/22 |
| 3,778,410 | 12/1973 | Jackson et al. | 528/173 |
| 3,836,491 | 7/1974 | Taft et al. | 260/22 |
| 4,189,421 | 2/1980 | Shay et al. | 260/38 |
| 4,267,239 | 5/1981 | Thankachan et al. | 428/425.1 |
| 4,298,658 | 11/1981 | Thankachan et al. | 428/425.1 |
| 4,331,782 | 5/1982 | Linden | 525/173 |
| 4,331,783 | 5/1982 | Stoy | 525/294 |
| 4,340,718 | 7/1982 | Zannucci et al. | 528/128 |
| 4,343,839 | 8/1982 | Blegen | 427/340 |
| 4,355,133 | 10/1982 | East et al. | 524/604 |
| 5,043,192 | 8/1991 | Jones et al. | 428/1 |

FOREIGN PATENT DOCUMENTS

| | | |
|---|---|---|
| 34919 | 9/1981 | European Pat. Off. |
| 286444 | 10/1986 | European Pat. Off. |
| 287233 | 10/1988 | European Pat. Off. |
| 419088 | 3/1991 | European Pat. Off. |
| 50-040629A | 4/1975 | Japan |
| 51-044130A | 4/1976 | Japan |
| 51-056839A | 5/1976 | Japan |
| 52-073929 | 6/1977 | Japan |

OTHER PUBLICATIONS

Lenz and Jin, Polymer News, 1986, 11, 200.
P. W. Morgan, Macromolecules, 1977, 10, 1381.
Jackson et al., J. Polym. Sci., Polym, Chem. Ed., 1976, 12, 2043.
Jackson et al., Bs. Polym. J., 1980, 12, 154.
Chen and Jones, J. Coat. Technology, 1988, 60, 39.
Chen and Jones, J. Appl. Polym. Sci., 1988, 36, 141.
S. P. Pappas, J. Coat. Technol., 1989, 61, 51.
Patent Abstract of Japan, vol. 14, No. 232 (C-719) (4175) May 17, 1990 and JP, A, 25 8 559 (Hitachi Chem. Co. Ltd.) Feb. 27, 1990.
K. Maruyama, et al., Japan. Kokai 75 40,629, 1975; Chem. Abstr. 1975, 83, 133572y.
K. Maruyama, et al., Japan. Kokai 76 56, 839, 1976; Chem. Abstr. 1976, 85, 110175y.
S. Nogami, et al., Japan. Kokai 76 44,130, 1976; Chem. Abstr. 1976, 85, 79835n.
S. Nogami, et al., Japan Kokai 77 73,929, 1977; Chem. Abstr. 1978, 88, 8624u.
Dimian and Jones, "Liquid Crystalline Oligoester Diols as Thermoset Coatings Binders," Ch. 22 Cross-Linked Polymers, ACS Symposium Series 367.

(List continued on next page.)

*Primary Examiner*—John Kight, III
*Assistant Examiner*—Duc Truong
*Attorney, Agent, or Firm*—Bernard J. Graves, Jr.; William P. Heath, Jr.

[57] ABSTRACT

Provided are enhanced phenolic-functional polyesters which are useful in enamel compositions. The enamel compostions provide coatings which exhibit superior hardness, impact resistance, acid resistance, and weatherability heretofore unachievable with other polyester-based coatings.

17 Claims, No Drawings

OTHER PUBLICATIONS

Wang and Jones, "Synthesis of Cross-Linkable Heterogenous Oligoester Diols by Direct Esterification with p-Hydroxybenzoic Acid," Ch. 23, Cross-Linked Polymers, ACS Symposium Series 367.

Delvin and Ober, Polymer Bulletin, 20, 45–51 (1988).

Jin et al., British Polymer Journal, Dec., 1980, pp. 132–146.

Jones, et al., Liquid Crystalline Polymers as Binders for Coatings, Fifteenth International Conference in Organic Coatings Science and Technology, Athens, Greece, Jul. 10–14 1989.

Derwent Publication Ltd., London, GB; AN 90-103274 and JP, A, 2 053 881 (Towa Kasei Kogyo) Feb. 22, 1990.

THERMOSETTING COATING COMPOSITIONS

CROSS-REFERENCE TO RELATED APPLICATION

This application is a continuation-in-part of U.S. Ser. No. 07/883,079, filed May 15, 1992, which is a continuation-in-part of U.S. Ser. No. 07/712,380, filed Jun. 10, 1991, now abandoned, incorporated herein by reference.

FIELD OF THE INVENTION

This invention belongs to the field of polymer chemistry. More particularly, this invention relates to improved phenolic-functional polyester coating compositions.

BACKGROUND OF THE INVENTION

There is a need in the coatings industry for high strength, high modulus, chemically-resistant coatings. For high modulus, the coatings must exhibit exceptional hardness, while for high strength, they must have good resistance to impact. As to chemical resistance, it is particularly desirable for automotive coatings to have excellent acid-etch resistance. This invention is directed toward the above objective. Crosslinkable polyester coatings resins are synthesized and formulated into industrial baking enamels from which surface coatings can be obtained, the cured films exhibiting an unique combination of hardness (pencil hardness>4H) and impact resistance (160 lb-in) as well as exceptionally high acid-etch resistance.

It has been demonstrated that thermotropic liquid crystal polymers (LCPs) possess many advantages over conventional thermoplastics. The self-reinforcement of the ordered polymeric molecules in the liquid crystalline (LC) state generally yield thermoplastics with exceptionally high strength and high modulus. In addition, LCPs have also been shown to have excellent solvent resistance, chemical resistance (e.g., acid, base, detergent), and weatherability. As described above, these properties are highly desirable in surface coatings. Recently, coating scientists have attempted to apply the LCP technology to the coatings art.

U.S. Pat. No. 5,043,192 (Jones) discloses the application of liquid crystalline polyesters to coatings which display high hardness and high impact resistance. In one of the examples, linear oligoester diols were prepared and modified with p-hydroxybenzoic acid (PHBA) to yield LC oligoesters. The PHBA/diol mole ratio varied from 2.1/1 to 13/1. It was suggested that the excess of PHBA formed repeating p-oxybenzoyl LC segments in the oligoester chain ends. The resulting resins, however, were highly colored (i.e., brownish). The use of large quantities of the expensive raw material, PHBA, also made the resins commercially impractical.

European Patent Application No. 419088 discloses non liquid crystalline esterphenol-capped liquid polymer and polyol compositions in combination with an amino crosslinking agent which provided films having superior properties. The resins were prepared by following a procedure similar to that of Jones at a lower reaction temperature (i.e., <200° C.) A PHBA/aliphatic hydroxyl equivalent ratio of 1/1 was used mostly, although it was suggested the ratio could be ranged from about 0.05 to about 1.25. This reference teaches that the coatings showed improved hardness and impact resistance. However, by repeating their examples I found the coatings did not exhibit high acid resistance.

Curable resin compositions modified with hydroxybenzoic acid had also been reported by others. U.S. Pat. No. 2,993,873 disclosed that drying times and coating properties of oil-modified alkyd resins could be improved by replacing part of unsaturated fatty acids with hydroxybenzoic acid in the resin formulations. The coatings were cured by air dry or baking without the presence of a crosslinking agent. U.S. Pat. Nos. 4,267,239 and 4,298,658 describe the modification of alkyd resins with PHBA. The resulting resins could be rapidly cured at ambient temperatures with isocyanates in the presence of a tertiary amine vapor. U.S. Pat. Nos. 4,343,839 and 3,836,491 disclose a coating composition which is rapidly curable at room temperature in the presence of a tertiary amine catalyst vapor. The coating compositions comprised phenolic terminated polyesters and multi isocyanate curing agents. U.S. Pat. No. 4,331,782 discloses the improved synthesis of a phenol-functional polyester polymer which utilizes a preformed adduct of a hydroxybenzoic acid and an epoxy compound. Japanese Patents No. 75 40,629, 76 56,839, 76 44,130, and 77 73,929 disclose powder coating compositions containing phenolic hydroxy end groups. These resins had high softening points and were applied to the surface as powders.

In an effort to raise the softening point of the melamine type crosslinking agent for powder coatings, U.S. Pat. No. 4,189,421 taught the synthesis of solid addition products having a softening point above 100° F by the reaction of a monohydroxy, single-ring aromatic compound and a hexakis(alkoxymethyl)amino-triazine ring (e.g., hexamethoxymethylmelamine, HMMM). They found the phenol compound not only could react with HMMM to form ether linkages (O-alkylation), but it could also form methylene bridges at the phenol ortho- or para-position (C-alkylation). The extent of both reactions was essentially equal. Further ring closure of the resulting product could also have occurred.

In the present invention, a smaller amount of PHBA was incorporated into the resins (i.e., about 15–16 mole %) to provide phenolic functionalities. Unlike the procedures described in both Jones' and Yezrielev's examples, no organic solvent was used for the synthesis of the resin. This feature allows the resins to be used in waterborne coating compositions. Further, this process is suitable for economical industrial production.

A branching agent, trimethylolpropane (TMP), was also incorporated into the resins which provided higher crosslink density. Further, I have discovered that the presence of TMP, a trifunctional compound, is required in order to yield higher molecular weight resins containing PHBA. Ostensibly, because the phenolic groups are not reactive under the conditions employed for resin synthesis, PHBA should be viewed as a monofunctional monomer which could terminate the polymer chain growth. I found that a triol such as TMP helps to propagate the growth of the polymer chain and affords surprisingly higher molecular weight resins; the coatings made possible by this discovery have strikingly better properties. This effect was found to be especially significant when PHBA was reacted with an excess of TMP only in the first stage of the resin synthesis as described below in the Examples. In these examples below, the carboxyl group of PHBA was capped by TMP to form a diol adduct in the first stage. The diol adduct was then polymerized with other diols and diacids in the second stage without causing the problem of decarboxylation of PHBA. The resulting resin had a number average molecular weight of greater than 1600 which was higher than other resins prepared by different methods. Finally, attempts at end-capping the reins with PHBA in the final stage of the reaction were unsuccessful in providing resins with higher molecular weight—these attempts resulted in significant PHBA sublimation as well as degradation of the polymer chain due ostensibly to ester interchange reactions.

SUMMARY OF THE INVENTION

The present invention provides oil-free polyester resin compositions containing phenolic functional groups which are prepared by an improved direct polycondensation process which is suitable for economical, large-scale production. The phenolic-functional resins thus produced are useful as coatings binders and thus may be dissolved in conventional solvents and formulated into thermosetting coating compositions which exhibit an extraordinary combination of pencil hardness and impact resistance as well as good acid resistance and weatherability. As noted below, substantially all of the hydroxy acid residues exist at the ends of the curable polyester chain, i.e., >90%. As used herein, the term "acid resistance" is intended to mean coatings which show very little degradative effect after exposure to 50% $H_2SO_4$ for 24 hours and whose free-standing films do not decompose in concentrated $H_2SO_4$ over a period of at least 30 minutes. As used herein, the term "weatherability" is intended to mean coatings which show a 60°/20° gloss retention of at least 70/50, respectively, after 1000 hours of Carbon Arc accellerated weathering and at least 90/80 after 1000 hours of QUV accellerated weathering as per these testing methods as described in the Experimental Section below. Accordingly, these coatings compositions are especially useful for applications where extreme environmental impact may be expected, e.g., automobile body exteriors.

DETAILED DESCRIPTION OF THE INVENTION

The present invention provides a curable polyester having a number average molecular weight of about 1500 to about 3000 and a weight average molecular weight of about 5000 to about 40,000, comprising
(a) about 20 to about 36 mole percent of diol residues, based on the total moles of (a), (b), (c), (d) and (e);
(b) about 10 to about 21 mole percent of triol residues, based on the total moles of (a), (b), (c), (d) and (e);
(c) about 0 to about 16 mole percent, based on the total moles of (a), (b), (c), (d) and (e), of residues of a linear aliphatic diacid;
(d) about 24 to about 40 mole percent of cylohexanedicarboxylic acid residues based on the total moles of (a), (b), (c), (d) and (e);
(e) about 12 to about 20 mole percent, based on the total moles of (a), (b), (c), (d) and (e), of hydroxy acid residues selected from residues of

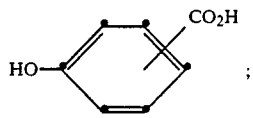

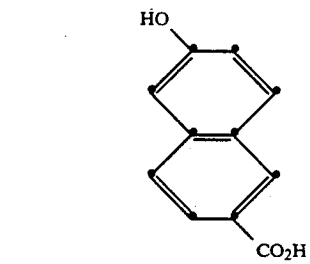
wherein A is halogen, $C_1$-$C_6$ alkyl, or phenyl;

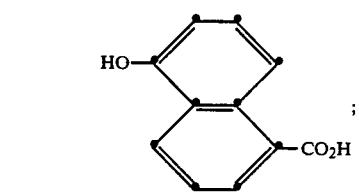

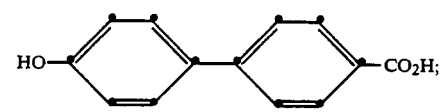

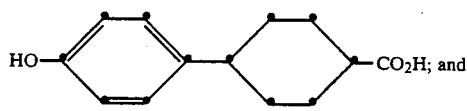

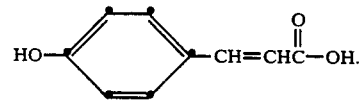

wherein substantially all of said hydroxy acid residues are located at the ends of the polymer chains to which they are attached.

As noted above, these curable polyesters are useful in preparing thermosetting coating compositions. Thus, as a further aspect of this invention, there is provided a curable enamel composition which when applied to a substrate and cured provides a coating having a pencil hardness of greater than 4H, an impact resistance of greater than 140 lb.-in., and being substantially resistant to acidic corrosion and weathering, said composition comprising (I) about 15 to about 40 weight percent of a curable polyester having a number average molecular weight of about 1500 to about 3000 and a weight average molecular weight of about 5000 to about 40,000 comprising
(a) about 20 to about 36 mole percent of diol residues, based on the total moles of (a), (b), (c), (d), and (e);
(b) about 10 to about 21 mole percent of triol residues, based on the total moles of (a), (b), (c), (d), and (e);
(c) about 0 to about 16 mole percent, based on the total moles of (a), (b), (c), (d), and (e), of residues of an aliphatic diacid;
(d) about 24 to about 40 mole percent of cyclohexanedicarboxylic acid residues based on the total moles of (a), (b), (c), (d), and (e);

(e) about 12 to about 20 mole percent, based on the total mole of (a), (b), (c), (d) and (e) of hydroxy acid residues selected from residues of

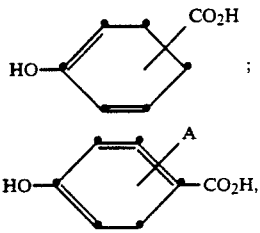

wherein A is halogen, $C_1-C_6$ alkyl; or phenyl;

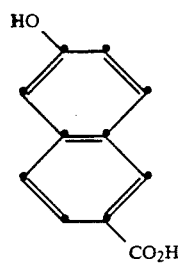

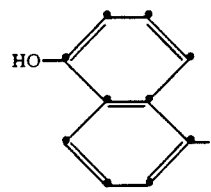

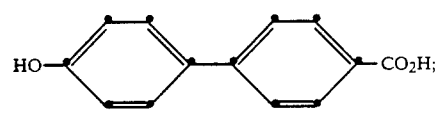

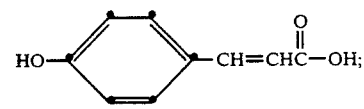

wherein substantially all of said hydroxy acid residues are located at the ends of the polymer chains to which they are attached;

(II) about 10 to about 50 weight percent of a solvent; and (III) about 5 to about 20 weight percent of a cross-linking agent.

As a further aspect of the present invention, there is provided a process for preparing a curable polyester having a number average molecular weight of about 1500 to about 3000 and a weight average molecular weight of about 5000 to about 40,000, comprising (a) about 20 to about 36 mole percent of diol residues, based on the total moles of (a), (b), (c), (d) and (e);

(b) about 10 to about 21 mole percent of triol residues, based on the total moles of (a), (b), (c), (d) and (e);

(c) about 0 to about 16 mole percent, based on the total moles of (a), (b), (c), (d) and (e), of residues of a linear aliphatic diacid;

(d) about 24 to about 40 mole percent of cyclohexanedicarboxylic acid residues based on the total moles of (a), (b), (c), (d) and (e);

(e) about 12 to about 20 mole percent, based on the total moles of (a), (b), (c), (d) and (e), of hydroxy acid residues selected from residues of

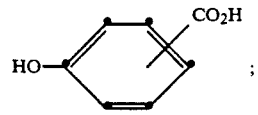

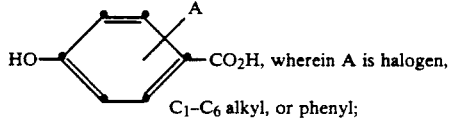

wherein A is halogen, $C_1-C_6$ alkyl, or phenyl;

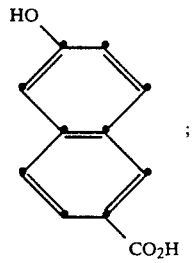

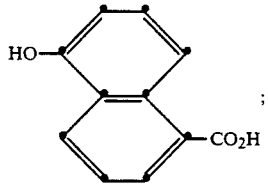

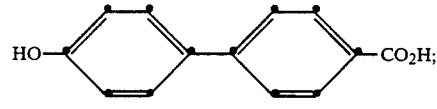

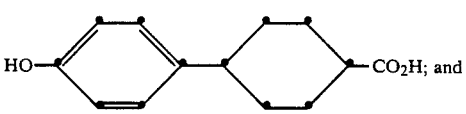

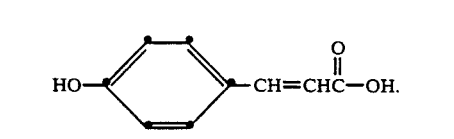

wherein substantially all of said hydroxy acid residues are located at the ends of the polymer chains to which they are attached;

which comprises combining component (b) triol with component (e) in the presence of a condensation catalyst, followed by heating to a temperature sufficient to induce condensation, followed by addition of components (a), (c), and (d), followed by continued heating until said condensation is substantially complete.

In the processes and curable polyesters described herein, preferred diols are chosen from ethylene glycol; propylene glycol; 1,3-propanediol; 2,4-dimethyl-2-ethylhexane-1,3-diol; 2,2-dimethyl-1,3-propanediol; 2- ethyl-2-butyl-1,3-propanediol; 2-ethyl-2-isobutyl-1,3-propanediol; 1,3-butanediol; 1,4-butanediol; 1,5-pentanediol, 1,6-hexanediol; 2,2,4-trimethyl 1,3-pentanediol; thiodiethanol; 1,2-cyclohexanedimethanol; 1,3-cyclohexanedimethanol; 1,4-cyclohexanedimethanol; 2,2,4,4-tetramethyl-1,3-cyclobutanediol; p-xylylenediol; diethylene glycol, triethylene glycol; tetraethylene glycol; and pentaethylene, hexaethylene, heptaethylene, octaethylene, nonaethylene, and decaethylene glycols. The most highly preferred diol is 2,2-dimethyl 1,3-propanediol.

Preferred triols include trimethylolpropane, trimethylolethane, glycerol, and the like. Trimethylolpropane is the most highly preferred triol.

The curable polyesters provided herein preferably have an acid number of not greater than 80 and a hydroxyl number of at least 10.

It should be appreciated that lower alkyl, i.e., $C_1$–$C_6$ alkyl, esters can be utilized in the above direct polycondensation, and in such an instance, the byproduct of the condensation will be a lower ($C_1$–$C_6$) alcohol.

In the above composition, the term "cyclohexane dicarboxylic acid" denotes the 1,2-, 1,3-, and 1,4-isomers.

Suitable solvents for the curable enamel composition include xylenes, cyclohexanone, ketones, (for example, methyl amyl ketone), 2-butoxyethanol, ethyl-3-ethoxypropionate, toluene, n-butanol, and other volatile inert solvents typically used in industrial baking (i.e., thermosetting) enamels. It should also be appreciated that the water borne enamel compositions generally contain about 0 to about 10 of one or more water miscible organic solvents.

The "amino cross linking agent" is preferably a melamine type cross linking agent, i.e., a cross-linking agent having a plurality of —N(CH$_2$O$^3$)$_2$ functional groups, wherein $R^3$ is $C_1$–$C_4$ alkyl, preferably methyl.

In general, the cross linking agent may be selected from compounds of the following formulae, wherein $R^3$ is independently $C_1$–$C_4$ alkyl:

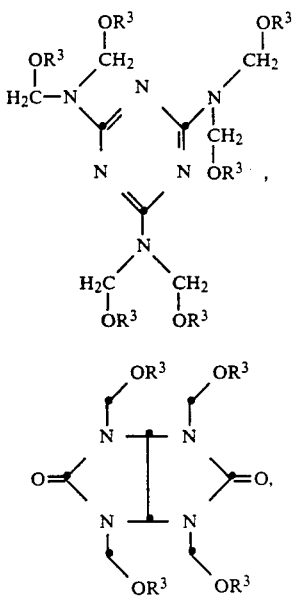

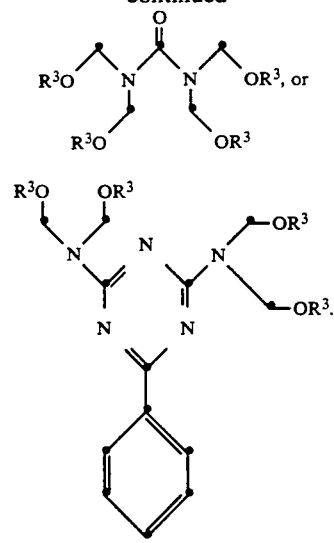

In this regard, preferred cross-linking agents include hexamethoxymethylmelamine, tetramethoxymethylbenzoguanamine, tetramethoxymethylurea, mixed butoxy/methoxy substituted melamines, and the like. The most preferred cross-linking agent is hexamethoxymethylmelamine.

As a further aspect of the present invention, there is provided a curable enamel composition further comprising one or more cross-linking catalysts. Examples of cross linking catalysts for melamine type cross linking agents include p-toluenesulfonic acid and NACURE ™ 155, 5076, 1051, catalysts sold by King Industries.

As a further aspect of the present invention there is provided a cross-linkable enamel composition as described above, further comprising one or more leveling, rheology, and flow control agents such as silicones, fluorocarbons or cellulosics; flatting agents; pigment wetting and dispersing agents; surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewicides; corrosion inhibitors; thickening agents; or coalescing agents.

Specific examples of such additives can be found in *Raw Materials Index*, published by the National Paint & Coatings Association, 1500 Rhode Island Avenue, N.W., Washington, D.C. 20005.

Examples of flatting agents include synthetic silica, available from the Davison Chemical Division of W. R. Grace & Company under the trademark SYLOID ®; polypropylene, available from Hercules Inc., under the trademark HERCOFLAT ®; synthetic silicate, available from J. M. Huber Corporation under the trademark ZEOLEX ®.

Examples of dispersing agents and surfactants include sodium bis(tridecyl) sulfosuccinnate, di(2-ethyl hexyl) sodium sulfosuccinnate, sodium dihexylsulfosuccinnate, sodium dicyclohexyl sulfosuccinnate, diamyl sodium sulfosuccinnate, sodium diisobutyl sulfosuccinnate, disodium iso-decyl sulfosuccinnate, disodium ethoxylated alcohol half ester of sulfosuccinnic acid, disodium alkyl amido polyethoxy sulfosuccinnate, tetrasodium N-(1,2- dicarboxy-ethyl)-N-oxtadecyl sulfosuccinnamate, disodium N-octasulfosuccinnamate, sulfated ethoxylated nonylphenol, 2-amino-2-methyl-1-propanol, and the like.

Examples of viscosity, suspension, and flow control agents include polyaminoamide phosphate, high molecular weight carboxylic acid salts of polyamine amides, and alkyl amine salt of an unsaturated fatty acid, all available from BYK Chemie U.S.A. under the trademark ANTI TERRA ®. Further examples include polysiloxane copolymers, polyacrylate solution, cellulose esters, hydroxyethyl cellulose, hydrophobically-modified hydroxyethyl cellulose, hydroxypropyl cellulose, polyamide wax, polyolefin wax, carboxymethyl cellulose, ammonium polyacrylate, sodium polyacrylate, and polyethylene oxide.

Several proprietary antifoaming agents are commercially available, for example, under the tradename Brubreak of Buckman Laboratories Inc., under the BYK ® trademark of BYK Chemie, U.S.A., under the FOAMASTER ® and NOPCO ® trademarks of Henkel Corp./Coating Chemicals, under the DREW-PLUS ® trademark of the Drew Industrial Division of Ashland Chemical Company, under the TROYSOL ® and TROYKYD ® trademarks of Troy Chemical Corporation, and under the SAG ® trademark of Union Carbide Corporation.

Examples of fungicides, mildewicides, and biocides include 4,4-dimethyloxazolidine, 3,4,4-trimethyloxazolidine, midified barium metaborate, potassium N-hydroxy-methyl-N-methyldithiocarbamate, 2-(thiocyanomethylthio) benzothiazole, potassium dimethyl dithiocarbamate, adamantane, N-(trichloromethylthio) phthalimide, 2,4,5,6-tetrachloroisophthalonitrile, orthophenyl phenol, 2,4,5-trichlorophenol, dehydroacetic acid, copper naphthenate, copper octoate, organic arsenic, tributyl tin oxide, zinc naphthenate, and copper 8-quinolinate.

Examples of U.V. absorbers and U.V. light stabilizers include substituted benzophenone, substituted benzotriazole, hindered amine, and hindered benzoate, available from American Cyanamide Company under the trademark CYASORB UV, and available from Ciba Geigy under the trademark TINUVIN, and diethyl-3-acetyl-4-hydroxy-benzyl-phonsphonate, 4-dodecyloxy-2-hydroxy benzophenone, and resorcinol monobenzoate.

Such paint or coating additives as described above form a relatively minor proportion of the enamel composition, preferably about 0.05 weight % to about 5.00 weight %.

As a further aspect of the present invention, there is provided a curable enamel composition optionally containing one or more of the above-described additives, further comprising one or more pigments.

Pigments suitable for use in the enamel compositions envisioned by the present invention are the typical organic and inorganic pigments, well-known to one of ordinary skill in the art of surface coatings, especially those set forth by the *Colour Index*, 3d Ed., 2d Rev., 1982, published by the Society of Dyers and Colourists in association with the American Association of Textile Chemists and Colorists. Examples include but are not limited to the following: CI Pigment White 6 (titanium dioxide); CI Pigment Red 101 (red iron oxide); CI Pigment Yellow 42, CI Pigment Blue 15, 15:1, 15:2, 15:3, 15:4 (copper phthalocyanines); CI Pigment Red 49:1, and CI Pigment Red 57:1.

Upon formulation above, the curable enamel composition is then applied to the desired substrate or article, e.g., steel, aluminum, or galvanized sheeting (either primed or unprimed), heated (i.e., cured) to a temperature of about 140° C. to about 175° C., for a time period of 5-60 minutes and subsequently allowed to cool. Thus, as a further aspect of the present invention, there is provided a shaped or formed article which has been coated with the thermosetting coating compositions of the present invention and cured.

Further examples of typical application and curing methods can be found in U S. Pat. Nos. 4,737,551 and 4,698,391, incorporated herein by reference.

As a further aspect of the present invention, there is provided a coating which results from the application and curing of the curable enamel composition as set forth above.

In Examples 1-3 below, TMP with a mole ratio of 30% based on the total moles of diol and triol, and an equivalent ratio of TMP/PHBA=2.55 was used.

EXAMPLE 1

Preparation of Resin 1

To a three-neck round bottom flask equipped with a mechanical stirrer, a steam partial-condenser, a Dean Stark trap, and a water condenser were charged the following reactants: TMP 30.28 g (0.23 mole), PHBA 36.83 g (0.27 mole), the catalyst, Fascat 4100 0.2 g, and the color stabilizer, WESTON 618 (from Borg-Warner Chemicals, Inc.) 0.2 g. The mixture was heated to 150° C. and stirred under $N_2$ atmosphere. The temperature was then gradually increased to 220° C. in a period of 0.5 hour and the distillate was collected in the Dean-Stark trap. When the collection of the distillate stopped (one more hour), indicating the first stage reaction was almost complete, NPG 55.50 g (0.53 mole), AD 20.42 g (0.14 mole), and 1,4-CHDA 91.78 g (0.54 mole) were then added. The reaction was complete after stirring for 4.5 more hours. The resulting viscous resin was collected in a metal container and cooled to rt.

EXAMPLE 2

Preparation of Resin 2

To a three-neck round bottom flask equipped with a mechanical stirrer, a steam partial-condenser, a Dean Stark trap, and a water condenser were charged the following reactants: TMP 30.28 g (0.23 mole), PHBA 36.83 g (0.27 mole), the catalyst, Fascat 4100 0.2 g, and the color stabilizer, WESTON 618 0.2 g. The mixture was heated to 150° C. and stirred under $N_2$ atmosphere. The temperature was then gradually increased to 220° C. and the distillate was collected in the Dean-Stark trap. After three hours, the collection of the distillate stopped, indicating the first stage reaction was almost complete, NPG 55.50 g (0.53 mole), AD 20.42 g (0.14 mole), and 1,3-CHDA 91.78 g (0.54 mole) were then added. The reaction was complete after stirring for seven more hours. The resulting viscous resin was collected in a metal container and cooled to rt.

EXAMPLE 3

Preparation of Resin 3

To a three-neck round bottom flask equipped with a mechanical stirrer, a steam partial-condenser, a Dean-Stark trap, and a water condenser were charged the following reactants TMP 30.28 g (0.23 mole), PHBA 36.83 g (0.27 mole), the catalyst, Fascat 4100 0.2 g, and the color stabilizer, WESTON 618 0.2 g. The mixture was heated to 150° C. and stirred under $N_2$ atmosphere. The temperature was then gradually increased to 200° C. and the distillate was collected in the Dean-Stark trap. After 2.5 hours, the collection of the distillate stopped, indicating the first stage reaction was almost complete, NPG 55.50 g (0.53 mole), AD 20.42 g (0.14 mole), and 1,2-CHDA anhydride 83.14 g (0.54 mole) were then added. The reaction was complete after stirring for 12 more hours. The resulting viscous resin was collected in a metal container and cooled to rt.

In Example 4 below, the amount of TMP was increased to 38 mole % with an equivalent ratio of TMP/PHBA=3. In this example adipic acid was replaced by additional CHDA.

EXAMPLE 4

Preparation of Resin 4

To a three neck round bottom flask equipped with a mechanical stirrer, a steam partial-condenser, a Dean-Stark trap, and a water condenser were charged the following reactants: TMP 36.18 g (0.27 mole), PHBA 36.83 g (0.27 mole), the catalyst, Fascat 4100 0.2 g, and the color stabilizer, Weston 618 0.2 g. The mixture was heated to 150° C. and stirred under $N_2$ atmosphere. The temperature was then gradually increased to 220° C. and the distillate was collected in the Dean-Stark trap. After three hours, the collection of the distillate stopped, indicating the first stage reaction was almost complete, NPG 46.26 g (0.44 mole) and 1,4-CHDA 112.88 g (0.66 mole) were then added. The reaction was complete after stirring for four more hours. The resulting viscous resin was collected in a metal container and cooled to rt.

A phenolic functional (PF) resin prepared previously as described in the example of the previous patent application, U.S. Ser. No. 07/883,079, was used as the control for the resins of the present invention. The control resin contains the same equivalent ratio of PHBA, whereas it has a lower percentage of TMP (14 mole %). The synthesis of the control is shown in Example 5.

EXAMPLE 5

Preparation of Control 1

To a three-neck round bottom flask equipped with a mechanical stirrer, a steam partial-condenser, a Dean-Stark trap, and a water condenser were charged the following reactants: NPG 67.66 g (0.65 mole), TMP 15.14 g (0.11 mole), 1,4-CHDA 45.89 g (0.27 mole), PHBA 36.83 g (0.27 mole), and the catalyst, Fascat 4100, 0.2 g. The mixture was heated to 150° C. and stirred under $N_2$ atmosphere. The temperature was then gradually increased to 220° C. in a period of two hours and the distillate was collected in the Dean-Stark trap. When the collection of the distillate stopped (two more hours), indicating the first stage reaction was almost complete CHDA 45.89 g (0.27 mole) and AD 20.42 g (0.14 mole) were then added. After stirring for nine more hours, a total of 29 ml of the distillate ($H_2O$) was collected. The resulting resin was poured into a metal container and cooled to rt.

Molecular weights of the above resins were determined by gel permeation chromatography. The results are listed in Table I below.

TABLE I

| Resin | Molecular Weight (MW) | |
|---|---|---|
| | Number Average MW | Weight Average MW |
| 1 | 1,800 | 19,000 |
| 2 | 1,900 | 36,000 |
| 3 | 1,600 | 6,800 |
| 4 | 1,800 | 32,000 |
| Control 1 | 1,500 | 6,100 |

The resins were dissolved in a solvent mixture and formulated into industrial baking enamels as described in Example 6. It was found that the resins were more soluble in the solvent mixture of 55% xylene, 32% MAK, 6.5% EEP, and 6.5% butanol by weight.

EXAMPLE 6

Preparation of Enamels

The resin (20 g) was dissolved in a suitable solvent mixture above (20–40 g). To this solution were added the crosslinker, hexamethoxymethyl melamine (HMMM, Cymel 303, 5 g), the acid catalyst (40% p-toluenesulfonic acid in i-PrOH, 0.2–0.4 g), and the fluorocarbon flow control additive (20% Fluorad FC-430 in i-PrOH, 0.3 g). The mixture was stirred in a mixer to give a clear enamel—Resin:HMMM=80:20. The enamel was applied to cold-rolled steel test panels and baked at 175° C. for 20 min. The film thickness was about 1.0–1.5 mil. These panels were used for the following tests.

EXAMPLE 7

Acid-Etch Resistance Test

The acid-etch resistance of the coatings was carried out by adding a few drops (e.g. six drops) of 10% sulfuric acid onto the film surfaces of the above coated panels and baked in an oven at various temperatures (i.e. 40°, 50°, 60°, and 70° C.) for 30 min. The residual acid solutions were then washed off, and their effects on the coating films were observed. The results are collected in Table II.

TABLE II

| | Acid Etch Resistance of Various Coatings | | | |
|---|---|---|---|---|
| Resin | 40° C. | 50° C. | 60° C. | 70° C. |
| 1 | 1 | 1 | 5 | |
| 2 | 1 | 1 | 5 | |
| 3 | 1 | 1 | 1–2 | 5 |
| 4 | 1 | 1 | 5 | |
| Control 1 | 1 | 3–4 | | |

1 - no effect
2 - partial loss of gloss
3 - loss of gloss
4 - partial loss of gloss
5 - loss of adhesion As illustrated in Table II, the acid etch resistance of the coatings based on the resins of the present invention has been improved significantly over the previous phenolic-functional resin. Among CHDA resins, 1,2-CHDA gives better acid-etch resistance than 1,3- and 1,4-isomers. It was also found that RESIMENE 755 (half butylated and half methylated melamine, available from Monsanto) generally gives better acid etch resistance than CYMEL 303 (fully methylated melamine, available from American Cyanamid)—sometimes by 10°.

Accelerated weathering tests of various coatings were carried out according to ASTM method G-53

(UV accelerated Weathering) and method D-822 with Cores glass filter (Carbon-Arc Accelerated Weathering). The results are collected in Table III.

TABLE III

Accelerated Weathering Tests of Various Coatings

| Resin | 60°/20° % Gloss Retention After 500 hr. | |
| --- | --- | --- |
| | Carbon Arc | QUV |
| 1 | 95/89 | 100/100 |
| 2 | 93/86 | 100/96 |
| Control 1 | 93/83 | 100/94 |

EXAMPLE 8

Preparation of Water-Borne Enamel Composition

Resin 1 (40 g) was heated to 180° C. and stirred in a round-bottom flask equipped with a water condenser. Trimellitic anhydride (1 g) was then added to the above resin and stirred for 30 minutes. After the mixture was cooled to 80° C., a co-solvent, ethylene glycol monobutyl ether (10 g) was added, followed by DMAE (1.25 g). The resulting viscous solution was then dispersed in distilled water (60 g) at 50° C. followed by the addition of CYMEL 303 (16 g) and FLUORAD FC-430 (20% in isopropanol, 0.6 g) to yield a water-borne enamel.

I claim:

1. A curable enamel composition which when applied to a substrate and cured provides a coating having a pencil hardness of greater than 4H, an impact resistance of greater than 140 lb.-in., and being substantially resistant to acidic corrosion and weathering, said composition comprising (I) about 15 to about 40 weight percent of a curable polyester having a number average molecular weight of about 1500 to about 3000 and a weight average molecular weight of about 5000 to about 40,000, comprising (a) about 20 to about 36 mole percent of diol residues, based on the total moles of (a), (b), (c), (d) and (e);

(b) about 10 to about 21 mole percent of triol residues, based on the total moles of (a), (b), (c), (d) and (e);

(c) about 0 to about 16 mole percent, based on the total moles of (a), (b), (c), (d) and (e), of residues of a linear aliphatic diacid;

(d) about 24 to about 40 mole percent of cylohexanedicarboxylic acid residues based on the total moles of (a), (b), (c), (d) and (e);

(e) about 12 to about 20 mole percent, based on the total moles of (a), (b), (c), (d) and (e), of hydroxy acid residues selected from residues of

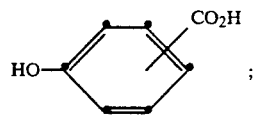

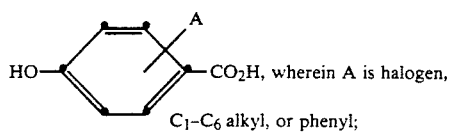

wherein A is halogen, $C_1$-$C_6$ alkyl, or phenyl;

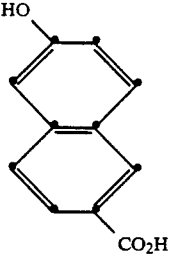

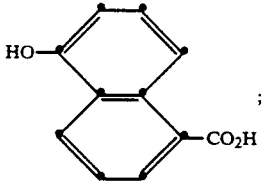

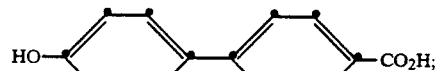

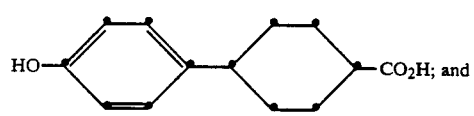

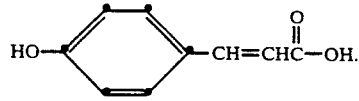

wherein substantially all of said hydroxy acid residues are located at the ends of the polymer chains to which they are attached;

(II) about 10 to about 50 weight percent of a solvent; and (III) about 5 to about 20 weight percent of a crosslinking agent.

2. The curable enamel composition of claim 1, wherein component (a) diol residues are selected from residues of

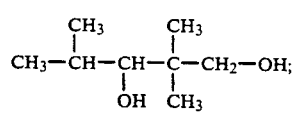

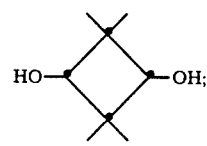

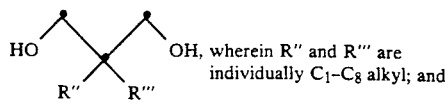

wherein R″ and R‴ are individually $C_1$-$C_8$ alkyl; and

-continued

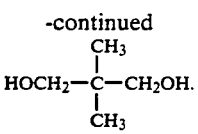

3. The enamel composition of claim 1, wherein component (b) triol residues are selected from residues of trimethylolpropane, trimethylolethane, and glycerol.

4. The enamel composition of claim 1 wherein the component (a) diol residue is comprised of a residue of the formula

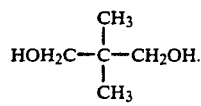

5. The enamel composition of claim 1, wherein the component (b) triol residue is comprised of trimethylolpropane residues.

6. The enamel composition of claim 1, wherein the hydroxy acid residue is a residue of a compound of the formula

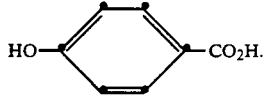

7. The enamel composition of claim 1, wherein the component (a) diol residues are comprised of a residue of the formula

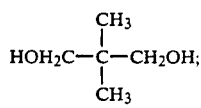

component (b) triol residues are comprised of trimethylolpropane residues;
component (c) aliphatic diacid residues are comprised of adipic acid residues; and
component (e) hydroxy acid residues are comprised of residues of a compound of the formula

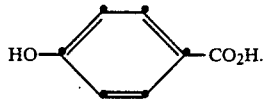

8. A water borne enamel composition which comprises
(I) about 25 to about 65 weight percent of a curable polyester having a number average molecular weight of about 1500 to about 3000 and a weight average molecular weight of about 5000 to about 40,000, comprising
  (a) about 20 to about 36 mole percent of diol residues, based on the total moles of (a), (b), (c), (d) and (e);
  (b) about 10 to about 21 mole percent of triol residues, based on the total moles of (a), (b), (c), (d) and (e);
  (c) about 0 to about 16 mole percent, based on the total moles of (a), (b), (c), (d) and (e), of residues of a linear aliphatic diacid;
  (d) about 24 to about 40 mole percent of cylohexanedicarboxylic acid residues based on the total moles of (a), (b), (c), (d) and (e);
  (e) about 12 to about 20 mole percent, based on the total moles of (a), (b), (c), (d) and (e), of hydroxy acid residues selected from residues of

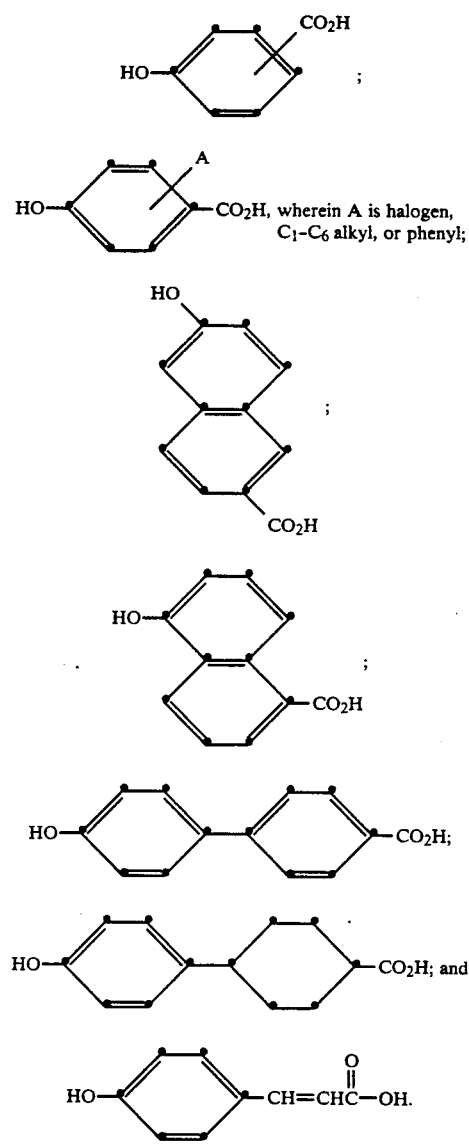

wherein substantially all of said hydroxy acid residues are at the ends of said curable polyester;
wherein said curable polyester, if having an acid number of less than 40, is modified by treatment with a polybasic acid to yield a modified curable polyester having an acid number of about 40 to 70, followed by treatment of the curable polyester or modified polyester with about 1 to about 4 weight percent of an amine;
(II) about 5 to about 20 weight percent of an amino crosslinking agent;
(III) about 0 to about 10 weight percent of a water-miscible organic solvent; and (IV) about 30 to about 70 weight percent of water.

9. The water-borne enamel composition of claim 8, wherein component (a) diol residues are selected from residues of

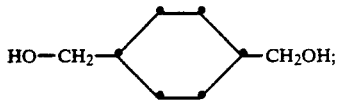

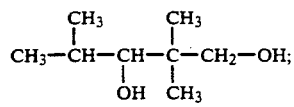

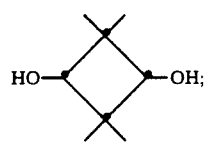

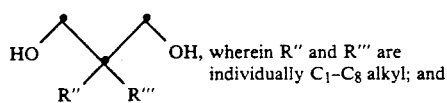 wherein R" and R'" are individually $C_1$-$C_8$ alkyl; and

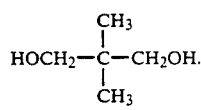

10. The water-borne enamel composition of claim 8, wherein component (b) triol residues are selected from residues of trimethylolpropane, trimethylolethane, and glycerol.

11. The water-borne enamel composition of claim 8 wherein the component (a) diol residue is comprised of a residue of the formula

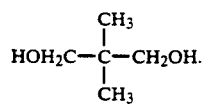

12. The water-borne enamel composition of claim 8, wherein the component (b) triol residue consists essentially of trimethylolpropane residues.

13. The water-borne enamel composition of claim 8, wherein the component (e) hydroxy acid residue is a residue of the formula

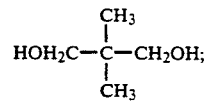

14. The water-borne enamel composition of claim 8 wherein the component (a) diol residues are comprised of a residue of the formula

component (b) triol residues are comprised of trimethylolpropane residues;
component (c) aliphatic diacid residues are comprised of adipic acid residues; and
component (e) hydroxy acid residues are comprised of residues of

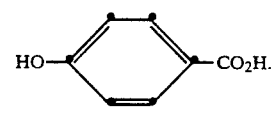

15. The water borne enamel composition of claim 8, further comprising one or more pigments.

16. A shaped or formed article coated with the cured enamel composition of claim 1.

17. An auto body or body part coated with the cured enamel composition of claim 1.

* * * * *